(12) United States Patent
Amsberry

(10) Patent No.: US 11,339,297 B2
(45) Date of Patent: May 24, 2022

(54) METHOD AND COMPOSITION FOR LIGHTNING PROTECTION

(71) Applicant: Kevin Amsberry, Denver, CO (US)

(72) Inventor: Kevin Amsberry, Denver, CO (US)

( * ) Notice: Subject to any disclaimer, the term of this patent is extended or adjusted under 35 U.S.C. 154(b) by 0 days.

(21) Appl. No.: 16/920,634

(22) Filed: Jul. 3, 2020

(65) Prior Publication Data

US 2021/0130618 A1 May 6, 2021

Related U.S. Application Data

(60) Provisional application No. 62/928,977, filed on Oct. 31, 2019.

(51) Int. Cl.
| | |
|---|---|
| *C09C 1/28* | (2006.01) |
| *C09D 5/00* | (2006.01) |
| *C04B 14/04* | (2006.01) |
| *D06M 11/00* | (2006.01) |
| *C09D 7/61* | (2018.01) |

(Continued)

(52) U.S. Cl.
CPC ............... *C09C 1/28* (2013.01); *C04B 14/04* (2013.01); *C04B 14/041* (2013.01); *C04B 14/043* (2013.01); *C09D 5/00* (2013.01); *C09D 5/24* (2013.01); *C09D 7/61* (2018.01);

(Continued)

(58) Field of Classification Search
None
See application file for complete search history.

(56) References Cited

U.S. PATENT DOCUMENTS 4,180,698 A 12/1979 Carpenter, Jr.
4,605,814 A 8/1986 Gillem
(Continued)

FOREIGN PATENT DOCUMENTS

CA 2577974 C 4/2008
CN 206971567 U * 2/2018

OTHER PUBLICATIONS

Lan, Ma, Li, Liu, Preparation of Nano Tourmaline Surface Treatment Agent and Its Application on Functional Wall fabrics, Jul. 29, 2016, All pages, vol. 67, published by EDP Sciences, 2016.

(Continued)

*Primary Examiner* — Colin W. Slifka
(74) *Attorney, Agent, or Firm* — Jennifer McCallum; The McCallum Law Firm

(57) ABSTRACT

A particulate composition suitable for protection against lightning is disclosed. The particulate composition comprises of a particulate matter comprising a mineral compound, preferably black tourmaline, capable of emitting negatively charged ions continuously, a grinding auxiliary agent, and a liquid medium. The particulate composition is embedded in a substrate, coating or mixed into the granules of composite roofing to protect people, objects and structures from lightning by developing a negatively charged cloaking shield to prevent the attraction of negatively charged lightning from striking. The composition infused or applied on a subject continuously emits negative ions sufficiently producing a protective electromagnetic cloaking shield restricting the wicking action of positive ions up from ground surface and thereby restricting the formation of positive streamers that reach upwards towards the stepped leaders of lightning.

20 Claims, 2 Drawing Sheets

(51) Int. Cl.
  *E04D 7/00* (2006.01)
  *C09D 7/40* (2018.01)
  *C09D 5/24* (2006.01)
  *C04B 111/00* (2006.01)
(52) U.S. Cl.
  CPC .............. *C09D 7/68* (2018.01); *D06M 11/00* (2013.01); *E04D 7/005* (2013.01); *C04B 2111/00586* (2013.01)

(56) References Cited

U.S. PATENT DOCUMENTS

| | | |
|---|---|---|
| 4,910,636 A | 3/1990 | Sadler et al. |
| 5,043,527 A | 8/1991 | Carpenter, Jr. |
| 5,080,810 A | 1/1992 | Smith et al. |
| 6,238,794 B1 | 5/2001 | Beesley et al. |
| 10,253,493 B2 | 4/2019 | Jenree et al. |
| 2004/0110639 A1 | 6/2004 | Joedicke |
| 2010/0083429 A1 | 4/2010 | Carraro |
| 2013/0298319 A1 | 11/2013 | Schlager |

OTHER PUBLICATIONS

Henry, Novak, Hawthorne, Ertl, Dutrow, Uher, Pezzotta, Nomenclature of the tourmaline-supergroup minerals, Jun. 1, 2011, pp. 895-913, vol. 96, Published by American Mineralogist.

Donnay, Structural mechanism of pyroelectricity in tourmaline, Nov. 1, 1977, pp. 927-932, vol. 33, Published by Acta Crystallographica Section A.

Fierro, Leslie, Mansell, Straka, Numerical Simulations of the Microphysics and Electrification of the WeaklyElectrified Feb. 9, 1993 Toga Coare Squall Line:Comparisons with Observations, Jan. 1, 2008, All Pafes, vol. 136, Published by American Meteorological Society.

Junping, Wei, Jinsheng, Yan, Kun, Youde, Effects of Particle Size on Far Infrared Emission Properties of Tourmaline Superfine Powders, Mar. 2010, Published by National Library of Medicine.

Article "About Air Ions", from Alpha Lab, Inc. Salt Lake City, Utah 84115, 2018.

Article "Dielectric Breakdown" from National Institute of Standards and Technology.

* cited by examiner

METHOD AND COMPOSITION FOR LIGHTNING PROTECTION

FIELD OF THE INVENTION

The present disclosure is related in general to the technical field of lightning protection methods, and in particular to the use of a particulate composition for the purpose of protection of people, structures and objects against damaging lightning.

BACKGROUND OF THE INVENTION

Lightning is produced, when air and water molecules in storm clouds collide to build up static electricity and negative charges migrate to the base of the storm clouds and form a type of shelf. The air normally acts as an insulator at first but as the static potential in the clouds increases it causes what is called a dielectric breakdown and the air becomes a conductor. It is known, that positive and negative charges attract and like charges such as negative/negative and positive/positive repel. Recently high-speed photography has caught something called positive streamers reaching up from stationary positions on the ground to meet downward stepped leaders we call lightning. As a lightning discharge gets close to occurring, the negatively charged storm clouds draw positively charged streamers up from the ground. The first negatively charged step leader and positively charged streamer to successfully connect will discharge the storm cloud.

The attraction of negative and positive ions explains why we see people often become targets while hiking, golfing or playing a sport outside because as they breathe and exhale the water vapor from their lungs create a cloud and/or coating of positive ions if they are not wearing the right footwear. Depending on their footwear they become high priority targets. A US Forestry Ranger in the northwestern United States has the record for being struck by lightning at least 5 times, likely for this reason. Lightning Safety Institute's web site states that while metal conducts lightning's electricity, it doesn't attract it, so the presence of metal makes no difference regarding where or when lightning strikes. People are struck by lightning because they are in the wrong place at the wrong time-anywhere outside is unsafe during a thunderstorm. Lightning strikes in low lying areas, as well as in higher elevations which is why lightning is considered the weather hazard most commonly experienced by most people in the world.

The conventional methods available to protect a subject from direct lightning strikes is to use some version of a lightning rod, to attract lightning with the opposite polarity then provide a conductive bypass for lightning strikes as they happen. This protection is only available to grounded structures and not people.

Currently there are several lightning protection methods and devices that use various versions of the passive bypass system of Benjamin Franklin's lightning rod to attract then divert electrical current from a lightning strike to a grounded location. Methods have become more sophisticated, but have followed the basic principles of placing lightning rods around the subject to be protected and directing the charge where they cause no harm. Based on the physics of electromagnetic energy as it applies to lightning, the only way for a lightning rod to be struck is if it emits more positive ions than other positive subjects sending up positive streamers. Wires lofted by balloons, rockets and kites have been used as well as different types of high-powered lasers to induce a lightning strike. Saline waterspouts have been suggested as well to attract lightning. None of these are completely safe, practical or truly effective.

Another lightning prevention system is termed dissipating systems because they attempt to neutralize the charge differential between the cloud and the protected facility before the flashover point occurs. The flashover point is seen as lightning. The present dissipative systems leak off the charge differential slowly before the flashover point is reached. However, the dissipating system also requires some kind of grounded equipment like the lightning rod to perform its function. As such, they provide protection only to buildings and structures and not to people or objects out in the open.

Recent advancements in the art provide a lightning protection device which includes a support structure adapted to be grounded and space charge producing conductors wound around the support structure and forming coils for producing space charge of opposite polarity to a cloud charge, in proximity of the object to be protected. The space charge induces a charge on the object to be protected of an opposite polarity to a charge induced on the object to be protected by the cloud charge and inhibits a formation of streamers from the object to be protected. Each space charge producing conductor has a diameter not exceeding 0.1 mm for reducing a corona inception voltage of the support structure upon which each space charge producing conductor is wound, in both dry and wet conditions.

One of the existing lightning protection devices includes an electrical dissipater comprising a multiplicity of fine electrically conductive wires having their proximate ends fitted into a hole in an electrically conductive base member and secured therein by crimping to securely grip the ends of the wires. One embodiment of the base member comprises a hollow tube allowing connection over an existing traditional lightning rod. In another embodiment, the base member comprises a solid rod or hollow tube having its proximal end threaded to allow the traditional lightning rod to be unthreaded from its threaded base and replaced. In a third embodiment, the base member comprises an apertured flange for bolting to the structure to be protected from lightning.

Another existing lightning protection device provides a lightning deterrent device which consists of a brush-like conductive structure particularly suited to be mounted on the top of a transmission tower. The device includes a central core formed into an annulus having a diameter sufficient to contain the vertical sides of the tower. The central core mounts a plurality of conductive wires captured therein at their midpoints. Sufficient wires are used to form a brush-like structure. The maximum number of wires is 250 per inch. The wires are preferably 10 inches long and have a diameter of about 0.014 inch. The device has been found to reliably protect against lightning strikes, and in the case of a television transmission tower, increase the signal by over 25 miles.

However, none of the above-mentioned devices include a method for protecting people and objects which are out in the open away from a structure that is protected from lightning by a grounded equipment. Based on the foregoing, there is a demonstrable need for a method of protection from lightning damage that repels lightning so no grounding apparatus is necessary. Such a needed method would make the dominant charge of the protected subject the same polarity such as negative-negative. Unlike lightning rods, the method would be available to every person, object and structure. The method would provide particular combinations of a particulate composition which emits negative ions continuously and when applied or infused correctly in a substrate, paint, coating or mixed into the granules of composite roofing provides a negatively charged ionic cloak of protection. The present invention overcomes prior art shortcomings by accomplishing these critical objectives.

SUMMARY OF THE INVENTION

The present invention provides a particulate composition used for the intended purpose of protection against damaging lightning. The invention protects people, structures and objects from being struck by lightning by using a method and process of pairing a negatively charged mineral compound with the negative polarity of lightning. Since like charges repel each other, lightning instead selects from a particular field of positively charged subjects, thus making the negatively charged subject invisible and safe from lightning strikes.

According to certain embodiments of the present invention, the particulate composition includes a particulate matter comprising a mineral compound capable of emitting negatively charged ions continuously, a grinding auxiliary agent, and a liquid medium in specific proportions. The present invention specifies exemplary combinations of the mineral Black Tourmaline which has been proven to emit negative ions continuously and when applied or infused correctly provides a negatively charged ionic cloak of protection.

In accordance with an aspect of the present invention, the composition is suitable for incorporating into or onto many products and surfaces. The composition when embedded in a substrate, coating or roofing granules continuously emits negative ions sufficiently producing a protective electromagnetic cloaking shield restricting the wicking action of positive ions up from ground surface and thereby restricting the formation of positive streamers that reach upwards towards the stepped leaders of lightning.

In accordance with another aspect of the present invention, the composition has anti-fungal properties. Adding the composition to roofing products not only protects the structure from lightning, it is protected from algae growth and unlike most common roofing granules the composition will not fade and protects the underlying asphalt layer from the ultraviolet rays of the sun.

In accordance with yet another aspect of the present invention, the composition emits far infrared waves allowing a subject to be highlighted on thermal search and rescue cameras. The composition can be applied to articles of clothing, helmets, outdoor gear, sporting equipment, footwear, aircraft, wind turbines as well as wrapping the base of trees, flagpoles and foundations.

Additionally, the present invention includes a method of preparation of the particulate composition for lightning protection.

A first objective of the present invention is to provide a particulate composition suitable for protection against lightning.

A second objective of the present invention is to provide a method of preparation of the particulate composition used for protection against lightning.

A third objective of the present invention is to provide a particulate composition suitable for textile infusion.

A further objective of the present invention is to provide a particulate composition suitable for use as a surface treatment agent.

A further objective of the present invention is to provide a particulate composition suitable for embedding into roofing granules.

These and other advantages and features of the present invention are described with specificity so as to make the present invention understandable to one of ordinary skill in the art.

BRIEF DESCRIPTION OF DRAWING

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION

Figure 1:
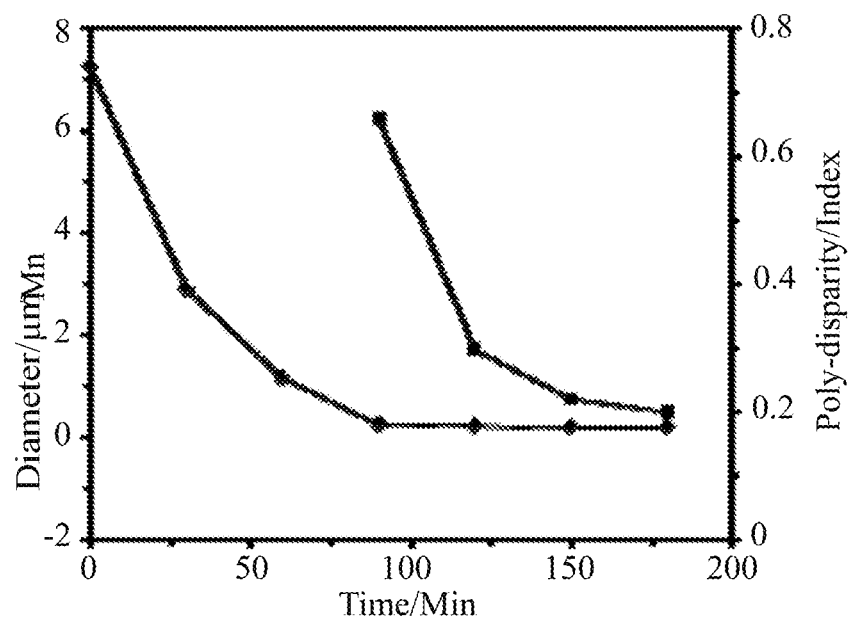
FIG. 1 illustrates a graph showing a relationship between milling time, particle diameter and poly-disparity index of a particulate composition according to a particular embodiment of the present invention.

In the following discussion that addresses a number of embodiments and applications of the present invention, reference is made to the accompanying drawings that form a part hereof, and in which is shown by way of illustration, specific embodiments in which the invention may be practiced. It is to be understood that other embodiments may be utilized and changes may be made without departing from the scope of the present invention.

The present invention provides a particulate composition and a method of preparation of the same used for the intended purpose of protection against damaging lightning. The invention is aimed at being able to protect people, structures and objects from being struck by lightning by using a method and process of pairing a negatively charged mineral compound with the negative polarity of lightning. Since like charges repel each other, lightning instead selects from a preferred field of positively charged subjects, thus making the negatively charged subject invisible and safe from lightning strikes.

One embodiment of the present invention provides a particulate composition comprising of a particulate matter comprising a mineral compound capable of emitting negatively charged ions continuously, a grinding auxiliary agent, and a liquid medium in specific proportions. Although other synthetically or organically produced elements could be substituted, the present invention specifies exemplary combinations of the mineral Black Tourmaline which has been proven to emit negative ions continuously and when applied or infused correctly provides a negatively charged ionic cloak of protection. Tourmaline had been widely researched for applications towards air and water purification, fabrics, coatings and cosmetics due to its ability to release and emit negative ions and also for its antifungal protection. The emitting performance of Black Tourmaline is transferable using various delivery systems embedded in a substrate, coating or mixed into the granules of composite roofing to protect people, objects and structures from lightning by developing a negatively charged cloaking shield to prevent the attraction of negatively charged lightning from striking.

The particulate composition continuously emits negative ions sufficiently producing a protective electromagnetic cloaking apparatus restricting the formation of positive streamers and restricting the wicking action of positive ions up from an agitated Earth's surface. Any organic or synthetic compound or substance emitting negative ions can be used in this method and process, but one embodiment of the present invention utilizes is a mineral compound defined as a select subspecies of Black Tourmaline because it never quits emitting negative ions and is common, plentiful in the environment and requires little processing.

The present invention provides a method of preparation of the particulate composition which is further used for infusion or as a surface treatment agent. The method comprises the steps of mixing a particulate matter with a grinding auxiliary agent and a liquid medium in specific proportions to make a particulate mixture. The particulate matter used here is black tourmaline powder. The liquid medium used is de-ionized water. Any conventional grinding auxiliary agent such as silica, alumina, talc or inorganic salts may be used. The black tourmaline powder, the grinding auxiliary agent and the de-ionized water is mixed to together in a proportion of 10:3:87 wt % based on 100 wt % of the composition. The particulate mixture is mechanically agitated to make an initial dispersion (NT). The dispersion is then grand milled with a grinding media such as 0.3 mm zirconia for a specific duration and then cooled to room temperature conditions. The ideal duration of time is three hours. A stable and high quality dispersion or anti-caking emulsion should be used.

Figure 2:
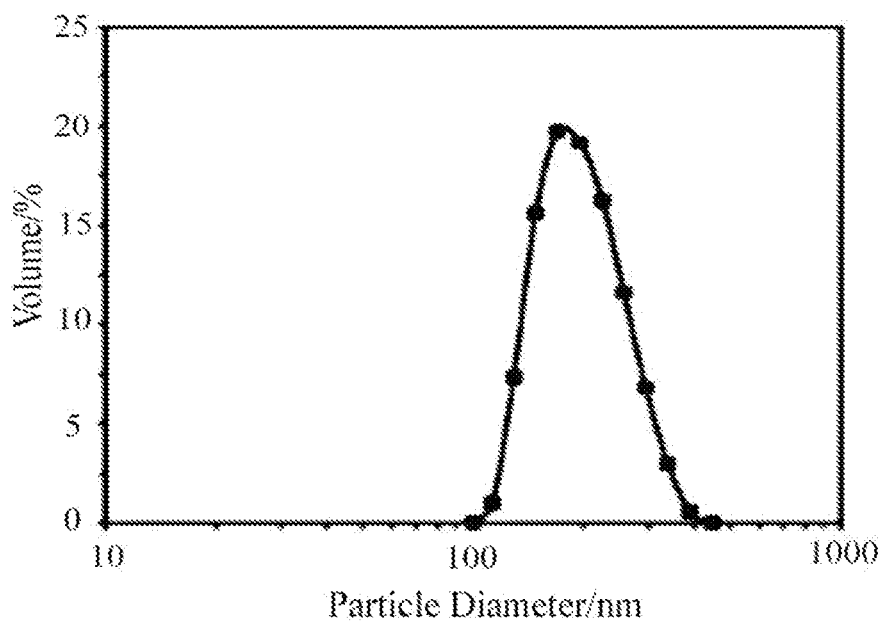
FIG. 2 illustrates a graph showing a particle diameter distribution with milling time in the particulate composition.

The relationship between the particle size and milling process time is shown in FIG. 1. When milling time lasted up to 90 min, the particle average diameter (d50) decreased to 240 nm and finally to 190 nm. The poly-dispersion index (PDI), which is a measure of the distribution of particle size populations in a given sample, should reach 0.220. The numerical value of PDI ranges from 0.0 (for a perfectly uniform sample with respect to the particle size) to 1.0 (for a highly poly-disperse sample with multiple particle size populations). Values of 0.2 and below are most commonly deemed acceptable in practice for nanoparticle materials. FIG. 2 shows the final particle diameter distribution with a milling time of 180 min.

One exemplary method of protection from lightning is with coatings or topical treatments or penetrating infusions of the particulate composition, prepared by the above-mentioned method, to any article of clothing, object or structure to prevent or restrict positive streamers by continuously emitting sufficient negative ions. Top down protection for people would be considered but not limited to a hat, helmet, umbrella, rain poncho or any article of clothing, protective shoes, protective socks, outdoor gear, sports equipment, nautical and boating equipment, lotion or aerosol. For structures it would be in the form of roofing, paint or coatings, landscaping materials whether residential or commercial, in the form of a tarp, tree wrapping protection, foundation or flag pole wrapping system, temporary or permanent platform, walkway, anything to do with sport stadiums, airports, airplanes, wind turbines or wind industry equipment, radio, TV and cell tower protection systems.

The particulate composition uses black tourmaline, which emits far infrared waves. A person using an article of clothing, outdoor gear or equipment with a topical coating of the composition with significant strength will be easier to find with thermal imaging equipment used by first responders and search and rescue teams.

The particulate composition may be used for textile infusion. Using flexible and absorbent substrates, the composition may be infused by the conventional technique of soaking an absorbent flexible substrate with an aqueous mixture of the composition, pressing the resultant soaked substrate to remove any excess surfactant, and then drying it. Vary the concentrations to vary the protection. In the following procedure the particulate composition was infused into textile fibers using an electrostatic spinning method. Using this method the textiles rapidly adsorbed the nano sized tourmaline particles inside and on the surface of the textile fibers. The various levels of negative ions to be released were documented. The method for testing and measuring the negative ions were based on the People's Republic of China Building Material Industry Standard JC/T 1016-2006 "Testing on negative ion concentration of materials" to control the environmental conditions with temperature at 23±1° C. and relative humidity at 50±5% using Air Ions Counter (COM-3600F, Japanese com-system Co. Ltd)

10 g of the particulate composition (NT) and 3 g of a proofing agent (TP) is mixed with 87 g of deionized water as the solution to prepare a surface treatment agent A1 (tourmaline content 1 wt %). The textiles are then dipped into the surface treatment agent for 30 seconds and then dried for 5 seconds at 160° C. The content formulation for various other versions of surface treatment agent is shown in Table 1 and was prepared with the same process. The series of textiles was treated with agent C after being treated by agent B1, B2, B3 and numbered B1C, B2C, B3C. The samples have same treatment process with the different nano tourmaline content named as follows; Treated A, Treated B, Treated BC. The average particle size of tourmaline in all the surface treatment agents is 190 nm.

TABLE 1

| No. | Dispersion NT (/g) | Agent (/g) | Deionized water (/g) |
|---|---|---|---|
| A1 | 10 | 3 | 87 |
| A2 | 30 | 3 | 67 |
| A3 | 50 | 3 | 47 |
| B1 | 10 | 0 | 90 |
| B2 | 30 | 0 | 70 |
| B3 | 50 | 0 | 50 |
| C | 0 | 3 | 97 |

Figure 3:
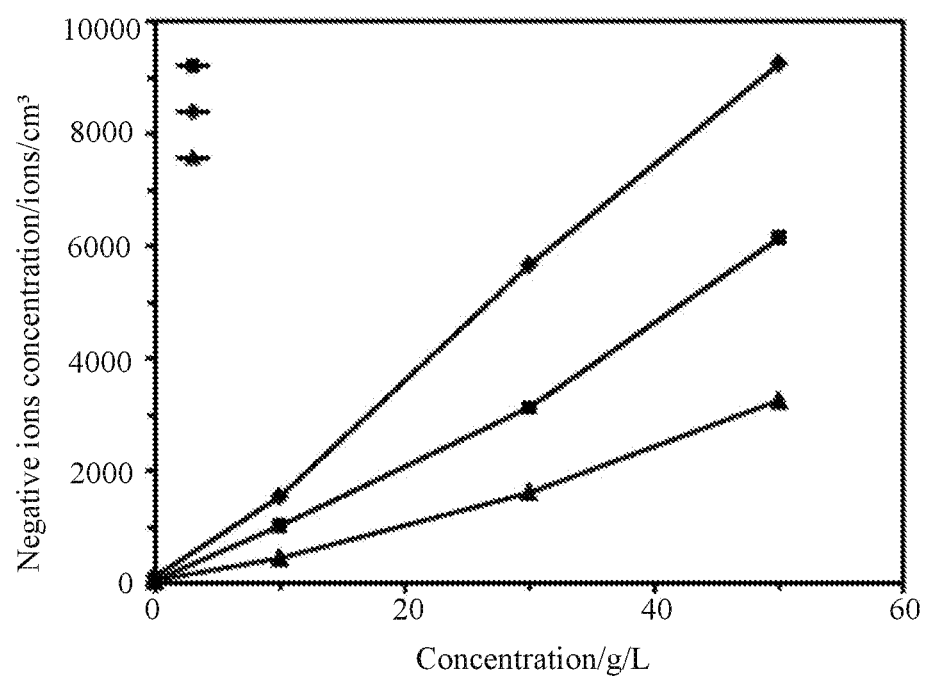
FIG. 3 illustrates a graph showing a relationship between the strength of negative ions emission and tourmaline content of different surface treatment agents prepared from the particulate composition.

FIG. 3 shows the relationship between the strength of negative ions emission and tourmaline content of different surface treatment agents. As shown in FIG. 3, different treatment processes have different negative ions performance levels. Both of Treated A and Treated BC showed the progressive quantity of negative ions being emitted by increasing nano tourmaline content. Although the negative ions emitted would increase by increasing nano tourmaline content, the maximum content of nano tourmaline was limited and decreased to less than 60 g/L since the balance should be considered between the cost, the high hardness of cloth and low gloss of cloth. Treated A and Treated BC compared with Treated B showed lowest negative ions emitting performance because the waterproofing treatment weakened the water molecular interaction with surface particles of the textile fibers.

The same content of nano tourmaline and three-proofing agents exhibited a dramatic difference between Treated A and Treated BC. Treated Textile A released a larger amount than Treated Textile BC. This unusual behavior can be explained by surface particle content. With the Treated Textile BC tourmaline particles adsorbed on the surface maybe covered with the water proofing agent, while Treated Textile A shows crowded particle relationship.

TABLE 2

| Tourmaline content (g/L) | Treated A (ions/cm3) | Treated B (ions/cm3) | Treated BC (ions/cm3) |
|---|---|---|---|
| 0 | 52 | 123 | 51 |
| 10 | 1031 | 1543 | 456 |
| 30 | 3134 | 5672 | 1621 |
| 50 | 6153 | 9253 | 3254 |

Table 2 is the relationship between the negative ion emitting performance and tourmaline content for the three treatment processes. All textiles with the Treated B process used a waterless proofing treatment. Although textiles with Treated B process can reach the maximum performance for emitting negative ions up to 9253 ions/cm3, waterproofing is the basic and suggested finishing application for textiles. Therefore, process for Treated Textile A is one suggested and exemplary performance level where the performance of the negative ions emitted can be up to 6153 ions/cm3 max. These techniques could be applied easily over a wide variety of surfaces apart from textiles.

As protection for structures, the particulate composition may be applied in the manufacturing process as part of the building's roof. The primary element of a roofing composition includes a particulate mixture that includes a particulate substrate, a hardness enhancer and a pigment. In the case of the present invention, for lightning protection the pigment will include tourmaline, hardness enhancer may include a clay, and the particulate substrate may include a feldspar. A method of making the composition may include mixing the particulate substrate, the hardness enhancer, and the pigment to form a particulate mixture, heat treating the particulate mixture, and coating the heat treated mixture with a hydrophobic coating.

The particulate composition of the present invention also promotes anti-fungal properties when incorporated with roofing granules. Mineral-surfaced asphalt shingle roofing can support the growth of discoloring algae. The present invention provides anti-fungal and anti-microbial properties that prevent algae growth.

Black roofing granules often fade to gray. A composition, containing black tourmaline particles of a specific size and an inorganic binder, suitable for use as a color coating on inorganic substrates provide a greater resistance to fade than conventional coating compositions. The particles have a mean particle size in the range of about 150 nm to about 500 nm and a surface area per weight of particles of about 20 $m^2/g$ or less. The composition is useful in producing coated inorganic granules for specific uses, such as roofing granules.

The foregoing description of a particular embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. A method for preparation of a particulate composition suitable for mixing into granules of composite roofing for protection against lightning, the method comprising the steps of:
    mixing a particulate matter including black tourmaline powder in an amount of 10 wt % with a grinding auxiliary agent in an amount of 3 wt % and deionized water in an amount of 87 wt % to make a particulate mixture;
    mechanically agitating the particulate mixture to make an initial dispersion;
    grand milling the dispersion with a grinding media for three hours to produce black tourmaline particles with an average size of 190 nm;
    cooling the dispersion to room temperature conditions; and
    mixing the particles into granules of composite roofing.

2. The method of claim 1 wherein said grinding auxiliary agent is selected from the group consisting of silica, alumina, talc or inorganic salts.

3. The method of claim 1, wherein said composite roofing has anti-fungal and anti-microbial properties.

4. The method of claim 1, wherein said composite roofing is resistant to fading.

5. The method of claim 1, wherein said composite roofing is adhered to a residential or commercial structure.

6. The method of claim 5, wherein said commercial structure is a temporary or permanent platform, a sports stadium, an airport, a wind turbine or a radio, tv or cell tower.

7. The method of claim 5, wherein said residential structure is a single-family home or a multi-family building.

8. The method of claim 1, wherein said composite roofing protects against lightning by emitting far infrared waves.

9. The method of claim 8, wherein said far infrared waves emit negative ions.

10. The method of claim 9, wherein said negative ions create a protective electromagnetic cloaking shield.

11. A particulate composition comprising:
    a particulate mixture that is mixed into granules of composite roofing for protection against lightning; and
    wherein the particulate mixture comprises a particulate matter including black tourmaline powder in an amount of 10 wt %, a grinding auxiliary agent in an amount of 3 wt %, and deionized water in an amount of 87 wt %.

12. The particulate composition of claim 11 wherein said grinding auxiliary agent is selected from the group consisting of silica, alumina, talc or inorganic salts.

13. The particulate composition of claim 11, wherein said composite roofing has anti-fungal and anti-microbial properties.

14. The particulate composition of claim 11, wherein said composite roofing is resistant to fading.

15. The particulate composition of claim 11, wherein said composite roofing is adhered to a residential or commercial structure.

16. The particulate composition of claim 15, wherein said commercial structure is a temporary or permanent platform, a sports stadium, an airport, a wind turbine or a radio, tv or cell tower.

17. The particulate composition of claim 15, wherein said residential structure is a single-family home or a multi-family building.

18. The particulate composition of claim 11, wherein said composite roofing protects against lightning by emitting far infrared waves.

19. The particulate composition of claim 18, wherein said far infrared waves emit negative ions.

20. The particulate composition of claim 19, wherein said negative ions create a protective electromagnetic cloaking shield.

* * * * *